United States Patent
Shivanand et al.

(10) Patent No.: US 10,459,661 B2
(45) Date of Patent: Oct. 29, 2019

(54) STREAM IDENTIFIER BASED STORAGE SYSTEM FOR MANAGING AN ARRAY OF SSDS

(71) Applicant: SAMSUNG ELECTRONICS CO., LTD., Suwon-si, Gyeonggi-do (KR)

(72) Inventors: Srikanth Tumkur Shivanand, Karnataka (IN); Sharath Kumar Kodase, Karnataka (IN); Rajeev Verma, Karnataka (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 78 days.

(21) Appl. No.: 15/687,167

(22) Filed: Aug. 25, 2017

(65) Prior Publication Data

US 2018/0059988 A1 Mar. 1, 2018

(30) Foreign Application Priority Data

Aug. 29, 2016 (IN) .............................. 201641029370

(51) Int. Cl.
*G06F 3/00* (2006.01)
*G06F 3/06* (2006.01)

(52) U.S. Cl.
CPC ............ *G06F 3/0659* (2013.01); *G06F 3/061* (2013.01); *G06F 3/0604* (2013.01); *G06F 3/0644* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 2010/0191896 | A1* | 7/2010 | Yang | G06F 12/0246 711/103 |
| 2011/0246706 | A1* | 10/2011 | Gomyo | G06F 3/0616 711/103 |
| 2011/0283049 | A1 | 11/2011 | Kang et al. | |
| 2016/0283125 | A1* | 9/2016 | Hashimoto | G06F 17/30123 |
| 2017/0228188 | A1* | 8/2017 | Hassani | G06F 3/0679 |

* cited by examiner

*Primary Examiner* — Daniel D Tsui
*Assistant Examiner* — Craig S Goldschmidt
(74) *Attorney, Agent, or Firm* — Volentine, Whitt & Francos, PLLC

(57) ABSTRACT

A storage system for managing an array of SSDs includes the array of SSDs and a host controller. Each of the SSDs is operable to store data. The host controller is configured to manage the array of SSDs as multiple logical volumes. Each of the logical volumes is associated with at least one stream ID. At least one of the SSDs and the host controller stores a system code configured to execute stream ID commands to access each of the logical volumes. Each of the logical volumes is dedicated to a memory region of each of the SSDs. Each of the logical volumes corresponding to the memory region of each of the SSDs are combined to form a logical volume group using the at least one stream ID. The host controller uses the stream ID commands to communicate with logical volumes of the logical volume group.

20 Claims, 11 Drawing Sheets

STREAM IDENTIFIER BASED STORAGE SYSTEM FOR MANAGING AN ARRAY OF SSDS

CROSS-REFERENCE TO RELATED APPLICATION

This U.S. non-provisional patent application claims priority under 35 U.S.C. § 119to Indian Patent Application No. 201641029370, filed on Aug. 29, 2016 in the Indian Intellectual Property Office, the contents of which are incorporated herein by reference in their entirety.

BACKGROUND

1. Technical Field

The present disclosure relates to a storage system. More particularly, the present disclosure relates to a stream identifier (ID) based storage system for managing an array of Solid State Disks (SSDs).

2. Description of the Related Art

SSDs are semiconductor devices and do not have any mechanical moving parts (unlike magnetic disks). This eliminates disk or SSD head seek latencies and increases performance for various input-output (TO) workloads. The SSDs are also more resilient to mechanical disturbances compared to the magnetic disks. Current SSDs support three basic IO operations, namely, write, read and erase respectively. The basic unit of data storage in the SSDs is a page (a group of flash memory cells, typically in 4 kilobyte (KB) capacity). Pages are further grouped into blocks. Granularity for reads and writes is at page-level, whereas the granularity of the erase operation is at block-level in the SSDs.

The erase operation in the SSDs is performed using a mechanism called garbage collection (GC). The GC is a term defining the process of reclaiming invalidated pages and creating usable free space on the SSDs. Whenever the GC process of a particular block in the SSD is ongoing, all the incoming requests corresponding to the particular block are delayed until the ongoing GC is completed. Thus, the incoming requests are stalled and placed in a queue and scheduled for service following the completion of the GC process. This stalling of the incoming requests (TO request) can degrade the performance of the storage system (i.e., SSDs) when incoming requests are bursty. The simultaneous (i.e., same time) operations of the GC and the IO operation at a same volume of the SSDs impacts the IO performance.

Normally, data analysis (such as Big-data) and on-line transaction processing (OLTP) are not serviced from the same storage server because, for example, they are different kinds of applications that require different capabilities. The OLTP applications use a server with faster IO operations per second (IOPS) than do data analysis applications. In the future, the growing demand for faster data analysis will require solutions such as hosting big-data/data analysis applications on high speed flash based storage servers just like the OLTP. A problem for currently doing this is due to the GC.

The GC is an unavoidable process in the SSDs. Currently, neither flash array (e.g., array of SSDs) instructions or the (non-volatile memory express) NVMe/Serial Attached small computer system interface (SAS) driver have any control over the GC inside the SSDs. The GC within the SSDs affects the IO operations or data computations (in case of smart SSD) to the flash array as the GC and IO operation may be operating or waiting on the same block.

The current mechanisms to support both high performance block storage and data analysis requires increased number of cores inside each SSD and increased processing capacity of each of the cores within the SSD so that storage system operations and data analysis can run within a given time. This may also increase Random Access Memory (RAM) requirements within the SSDs. All the above techniques are costly as they increase cost of each of the SSDs, and consequently cost of flash array systems or arrays of SSDs will increase. Sometimes there needs to be special hardware support for compression to meet the IO performance requirements.

The above information is presented as background information only to help the reader understand the present disclosure. Applicants have made no determination and make no assertion as to whether any of the above might be applicable as Prior Art with regard to the present application.

SUMMARY

A principal object of the embodiments herein is to provide a stream ID based storage system for managing an array of SSDs.

Another object of the embodiments herein is to provide the storage system with an array of SSDs to store data, and a host controller configured to manage the array of SSDs as multiple logical volumes. Each of the logical volumes is associated with at least one stream identifier (ID). Each of the SSDs may store and implement a system code configured to execute stream ID commands to access each of the logical volumes.

Yet another object of the embodiments herein is to provide the storage system with a host controller to receive a request to access a logical block addressing (LBA) of a logical volume from the logical volumes.

Yet another object of the embodiments herein is to provide the storage system with a host controller to receive a LBA compute request on a set of blocks of a logical volume, logically addressed by logical block addressing (LBA), from the logical volumes.

Yet another object of the embodiments herein is to provide the storage system with the host controller to determine the stream ID corresponding to the logical volume.

Yet another object of the embodiments herein is to provide the storage system with the host controller to detect a status of the stream ID corresponding to the logical volume from a non-volatile random-access memory (NVRAM) using the stream ID command. The status is one of active and passive and the stream ID command is one of a stream ID active command, a stream ID idle command, and a get stream ID status command.

Yet another object of the embodiments herein is to provide the storage system with the host controller to cause to one of (1) allow access to the logical block addressing (LBA) of at least one SSD from the SSDs corresponding to the stream ID of the logical volume when the status of the stream ID is detected as active, and (2) perform a garbage collection function on at least one SSD from the SSDs corresponding to the stream ID of the logical volume when the status of the stream ID is detected as passive.

Yet another object of the embodiments herein is to provide the storage system with the host controller to cause to one of (1) allow access to the logical block addressing (LBA) of at least one SSD from the SSDs corresponding to the stream ID of the logical volume when the status of the stream ID is detected as active, and (2) perform a LBA compute function on at least one of the SSDs from the SSDs corresponding to the stream ID of the logical volume when the status of the stream ID is detected as passive.

Embodiments herein provide a storage system for managing an array of SSDs. The storage system includes the array of SSDs and a host controller. Each of the SSDs is operable to store data. The host controller is configured to manage the array of SSDs as multiple logical volumes. Each of the logical volumes is associated with at least one stream ID and corresponds to dedicated portions of multiple of the SSDs. At least one of the SSDs and the host controller stores and implements a system code configured to execute stream ID commands to access each of the logical volumes.

Embodiments herein also provide a host device for managing the array of SSDs. The host device includes a processor and a host controller connected to the processor and the array of the SSDs. The host controller is configured to manage the array of SSDs as multiple logical volumes. Each of the logical volumes is associated with at least one stream identifier (ID) and corresponds to dedicated portions of multiple of the SSDs. The host controller stores and implements a system code configured to execute stream ID commands to access each of the logical volumes.

Embodiments herein additionally provide a method for managing the array of SSDs. The method includes receiving, by a host controller, a request to access the logical block addressing (LBA) of a logical volume from the array of SSDs. The SSDs are dedicated to multiple logical volumes that each correspond to dedicated portions of multiple of the SSDs. Further, the method includes determining, by the host controller, a stream ID corresponding to the logical volume. Further, the method includes detecting, by the host controller, a status of the stream ID corresponding to the logical volume. The status is one of active and passive. Further, the method includes causing, by the host controller, to one of allow access to the logical block addressing (LBA) of at least one SSD from multiple SSDs corresponding to the stream ID of the logical volume when the status of the stream ID is detected as active, and perform a garbage collection function on at least one SSD from the plurality of SSDs corresponding to the stream ID of the logical volume when the status of the stream ID is detected as passive.

Embodiments herein moreover provide a method for managing the array of SSDs. The method includes receiving, by a host controller, a request to access the logical block addressing (LBA) of a logical volume from the array of SSDs and also a request to do an LBA compute function on the same volume. The SSDs are dedicated to multiple logical volumes that each correspond to dedicated portions of multiple of the SSDs. Further, the method includes determining, by the host controller, a stream ID corresponding to the logical volume. Further, the method includes detecting, by the host controller, a status of the stream ID corresponding to the logical volume. The status is one of active and passive. Further, the method includes causing, by the host controller, to one of allow access to the logical block addressing (LBA) of at least one SSD from multiple SSDs corresponding to the stream ID of the logical volume when the status of the stream ID is detected as active, and perform a LBA compute function on at least one SSD from the SSDs corresponding to the stream ID of the logical volume when the status of the stream ID is detected as passive.

BRIEF DESCRIPTION OF THE DRAWINGS

The above and other aspects, features, and advantages of certain embodiments of the present disclosure will be more apparent from the following description with reference to the drawings, in which.

DETAILED DESCRIPTION OF THE EMBODIMENTS

Figure 1:
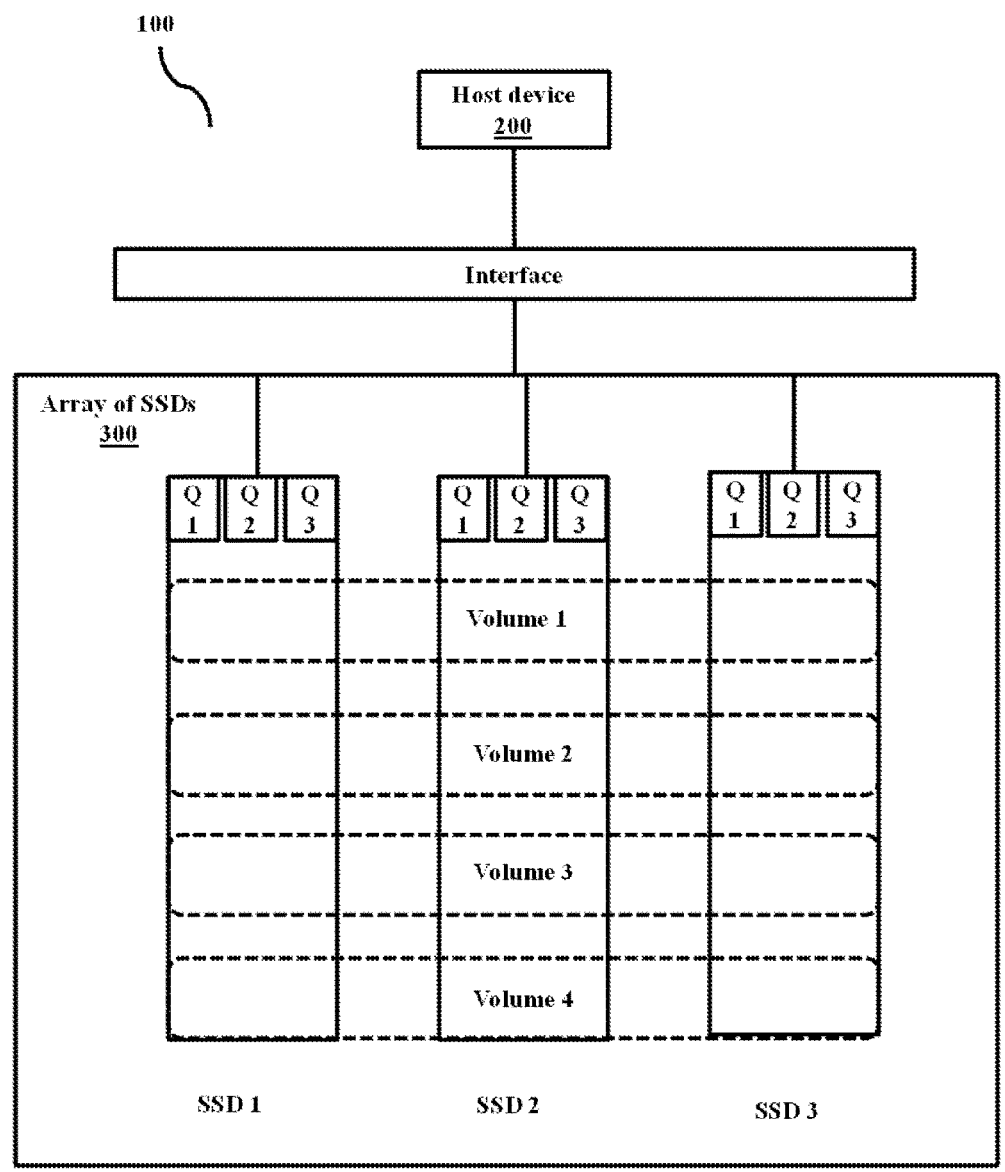
FIG. 1 illustrates an overview of a storage system for managing an array of SSDs based on a stream identifier (ID), according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In accordance with an embodiment of the present disclosure, a host device is provided for managing an array of SSDs based on a stream identifier (ID). The host device includes a processor, and a host controller coupled to the processor and the array of SSDs. The host controller is configured to manage the array of SSDs as multiple logical volumes. At least one, but typically all, logical volumes include dedicated portions of multiple, but typically all, SSDs in the array. Each of the logical volumes is associated with at least one stream ID. The host controller is also configured to: receive a request to access logical block addressing (LBA) of the logical volume from the multiple logical volumes; determine a stream ID corresponding to the logical volume; and detect a status of the stream ID corresponding to the logical volume from the NVRAM. The status is one of active and passive. The host controller is also configured to: cause to one of (1) allow access to the logical block addressing (LBA) of at least one SSD from the multiple SSDs corresponding to the stream ID of the logical volume when the status of the stream ID is detected as active, and (2) perform the garbage collection function on at least one of the SSDs from the multiple SSDs corresponding to the stream ID of the logical volume when the status of the stream ID is detected as passive.

In accordance with an embodiment of the present disclosure, a storage system is provided for managing an array of SSDs based on a stream identifier (ID). The storage system includes the array of solid-state drives (SSDs). Each of the SSDs is operable to store data. A host controller is configured to manage the array of SSDs as multiple logical volumes. At least one, but typically all, logical volumes include dedicated portions of multiple, but typically all, SSDs in the array. Each of the logical volumes is associated with at least one stream identifier (ID). Each of the SSDs stores and implements a system code configured to execute stream ID commands to access each of the logical volumes.

Storage systems described herein may coordinate with log-structured arrays (LSA), a redundant array of independent disks (RAID), and/or the SSDs, so as to manage the GC to increase the performance of the SSDs.

In the conventional mechanism, the GC within the SSD affects the IO operations or data computations (in case of smart SSD) of the flash array system (for example, the array of SSDs). However, the mechanisms described herein coordinate with the host controller and the NVRAM of the SSDs to avoid the interference between the GC and IO operations.

Storage systems described herein (e.g., with stream ID based logical volume or logical unit management (LUM)) may improve the performance of the IO operations in enterprise storage management for the SSD array (i.e., array of SSDs).

Storage systems described herein may avoid overlapping of the GC and the IO operation and implement power management across each volume/volume group of the array of SSDs.

Storage systems described herein may support the OLTP and data analytics on a single storage system (i.e., single storage server) without compromising the performance thereto.

Storage systems described herein may provide an easy way to synchronize the GC phase and write phase using the stream ID commands. Storage systems described herein may reduce write latency during the IO operation.

Storage systems described herein may provide active and idle stream IDs which may be orchestrated to obtain best performance from all the SSDs.

Storage systems described herein may improve power management of the SSD. The array of SSDs can orchestrate the power state of the volume/volume group of the array of the SSDs which are in the active and the idle state.

Storage systems described herein may increase performance of data analysis compared to a traditional stack.

Storage systems described herein use stream ID based storage system management to coordinate the SSDs in the array of SSDs, and do not require any changes in existing SSD hardware. Wherein the conventional mechanisms lag performance due to GC, mechanisms described herein also accommodates the two most widely used use cases i.e. data analytics and OLTP, in the same server without compromising performance. The stream ID based storage system management for an array of SSDs increases endurance of the SSDs.

Storage systems described herein may improve computing capacity of the storage systems while keeping system through-put high.

Referring now to the drawings, and more particularly to FIGS. 1 through 11, where similar reference characters denote corresponding features consistently throughout the figures, these are shown in preferred embodiments.

FIG. 1 illustrates an overview of a storage system 100 for managing an array of SSDs 300 based on a stream ID, according to an embodiment as disclosed herein.

Initially, however, SSDs 300 are explained as flash memory. Flash memory can be arranged in 2-dimensional or 3-dimensional structures. As explained in the introduction section, flash memory may be arranged in basic units of blocks divided into pages. Within a page, parallel strings of memory and other types of transistor-based cells are arranged in one dimension, and lines for controlling (e.g., selecting) similar cells of each string are provided in another direction. The blocks, pages, strings of cells, and the individual cells may each correspond to a physical address that is provided sequentially for the blocks, pages, strings of cells, and individual cells of the SSDs 300. Accordingly, the SSDs 300 can be apportioned into portions of different sections of physically delineated blocks, pages, strings of cells and individual cells. Moreover, as explained herein, when logical addressing is provided, the SSDs 300 can be logically apportioned with logical addresses such as addresses of different logical volumes. In a logical volume, logical addresses of the logical volume may be limited to physically adjacent blocks, pages, strings of cells and individual cells within one or more SSDs. Alternatively, a logical volume may include dedicated blocks, pages, strings of cells and individual cells that are not adjacent within a particular SSD of the one or more SSDs.

The storage system 100 includes a host device 200 and the array of SSDs 300 interconnected through an interface. The host device 200 is configured to manage the incoming requests (i.e., read/write request pertaining to a particular application). The interface is to allow the host device 200 to communicate with the array of SSDs 300. For example, the interface may be a switched fabric, such as that found in a SAS topology employing SAS expanders and other SAS and/or peripheral computer interface (PCI) devices. The array of SSDs 300 is a data storage system which includes multiple SSDs (for example: SSD1, SSD2, and SSD3). Further, the array of SSDs 300 is logically divided into multiple logical volumes (for example, volume 1, volume 2, and volume 3). Each of the logical volumes is associated with at least one stream ID to uniquely identify the logical volume of the SSD. For example: stream ID 1 identifies volume 1, stream ID 2 identifies volume 2, and stream ID 3 identifies volume 3. The multiple logical volumes together form a logical volume group. The association of the logical volumes of the logical volume group and the set stream IDs can be maintained in the form of a mapping table (as shown in Table 1 below) or a tree based data-structure.

Stated perhaps differently, FIG. 1 shows three SSDs, i.e., SSD 1, SSD 2, and SSD 3. FIG. 1 also shows four volumes, i.e., Volume 1, Volume 2, Volume 3, and Volume 4. Each volume is dedicated to portions (i.e., less than the entirety) of each SSD, i.e., SSD 1, SSD 2, and SSD 3. Each SSD includes different portions (i.e., less than the entirety) dedicated to each volume, i.e., Volume 1, Volume 2, Volume 3, and Volume 4. In FIG. 1, the portions of each SSD dedicated to any volume do not overlap the portions of each SSD dedicated to any other volume, so that the portions of any SSD dedicated to a volume are logically segregated from portions of the same SSD dedicated to another volume. Moreover, in FIG. 1, the portions of each SSD assigned to any volume are less than the entirety of the volume. Accordingly, a logical volume is not to be interpreted as being all or part of a single SSD. Further, at least one, and in FIG. 1 all, of the logical volumes include non-overlapping portions of multiple, and in FIG. 1 all, of the SSDs dedicated to the logical volumes.

In an embodiment, each of the logical volumes is dedicated to a memory region of each of the SSDs. All of the logical volumes are combined to form the logical volume group using the at least one stream ID. The host device 200 uses stream ID commands to communicate with logical volumes of the logical volume group which are uniquely identified using the at least one stream ID.

TABLE 1

| Volume ID | SSD, Stream ID |
|---|---|
| Vol-1 | (SSD-0, Stream-ID-1), (SSD-1, Stream-ID-1) . . . (SSD-10, Stream-ID-1) |
| Vol-2 | (SSD-0, Stream-ID-2), (SSD-1, Stream-ID-2) . . . (SSD-10, Stream-ID-2) |
| Vol-3 | (SSD-0, Stream-ID-3), (SSD-1, Stream-ID-3) . . . (SSD-10, Stream-ID-3) |

In an embodiment, the mapping table of the logical volumes of the logical volume group and the set stream IDs shows that the data is redundantly stored (For example: parity groups).

The stream ID is a unique ID assigned to each logical volume of the SSD. The SSD internally uses this unique stream ID as a context to manage data. The data may be managed by lifetime-expectancy, such as by assigning a unique ID to only data having the same or a similar lifetime-expectancy. The data is written to the stream ID of the volume associated with each of the SSDs according to the life expectancy of the data. The stream ID is used as the life expectancy value for writing a group of related files predicted to be stored in the SSD for substantially the same length of time.

The SSD stores all data belonging to a stream ID together and does not mix data from different streams. The host device 200 can open/read/write data corresponding to the stream ID(s) of the logical volumes of SSD. Each of the SSD belonging to the logical volume may have multiple queues (for example Q1, Q2, and Q3 and so on). The queues associated with the array of SSDs 300 are configured to store the incoming IO requests received from the host device 200.

The host device 200 uses the stream ID commands to communicate with a logical volume of the logical volume group which is uniquely identified using the at least one stream ID. The stream ID commands are given below:

A stream ID active command (stream ID): A system code present in (e.g., stored in, hosted by, executed by, implemented by) at least one of the SSDs. The host device 200 may invoke the stream ID active command to set a particular stream ID as active. The stream ID is associated with a logical volume to which portions of each of the SSDs from the array of SSDs 300 are dedicated. The stream ID active indicates that the IO is ongoing (or, for example, IO may be expected). The system code can be a set of instruction or protocols (e.g., firmware) to execute the stream ID commands.

A stream ID idle command (stream ID, int TYPE): The system code present in at least one of the SSDs and the host device 200 may invoke the stream ID idle command to set a particular stream ID as passive. The stream ID idle implies that the stream ID associated with a block/stripes can be put under GC or maintenance activity. Power management in idle stream IDs of the SSD can keep region in low power mode.

The TYPE of the stream ID idle command determines the idle command to be executed.

For example:
POWER DOWN—A stream ID idle command with the TYPE Power Down/Power Mode ON indicates a low power state.
Data computation—A stream ID idle command with the TYPE Data Commutations runs associated data to compute a program on the stream ID.
Global GC—A stream ID Idle command with the TYPE Global GC can run GC on the stream ID.
Custom—A stream ID idle command with the TYPE Custom can run a specific command for extension purposes.

A Get stream ID status command (stream ID): The system code present in at least one of the SSDs and the host device 200 may call (i.e., invoke) this command to determine the stream ID status information in the current cycle of the IO operation.

The stream ID commands can be used for a single SSD by a SSD driver or a group of SSDs (array of SSDs 300) by utilizing the RAID instructions. The stream ID commands can be used by the RAID which has a host GC and the RAID which doesn't perform the host GC. The stream ID commands can help in identifying a maintenance region (i.e., GC region) by both the system code and SSD so that writing to that region can be avoided, thus eliminating the overlap between the GC and the write.

Storage system 100 can orchestrate active and idle stream IDs to obtain the best performance from all the SSDs.

The FIG. 1 shows a limited overview of the storage system 100 but it is to be understood that other embodiments are not limited thereto. In other embodiments, the storage system 100 may include less or more number of devices and components and logical volumes interacting together to provide the stream ID based storage system 100 to manage the array of SSDs 300.

Figure 2:
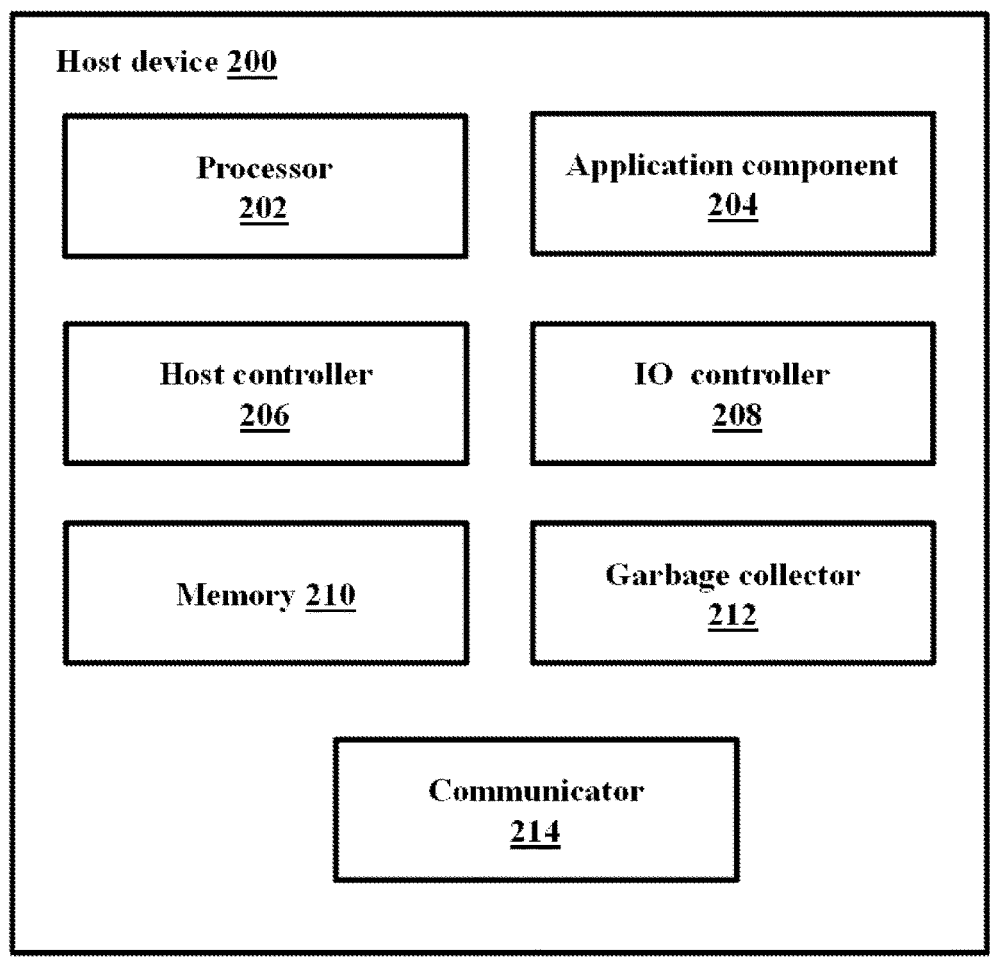
FIG. 2 illustrates a block diagram of a host device for managing IO operations based on a stream identifier (ID), according to an embodiment as disclosed herein.

FIG. 2 illustrates a block diagram of a host device 200 for managing IO operations based on stream ID, according to an embodiment as disclosed herein.

In an embodiment, the host device 200 includes a processor 202, an application component 204, a host controller 206, an IO controller 208, a memory 210, a garbage collector 212 and a communicator 214. The host controller 206 is connected to the processor 202 and an array of SSDs 300 and is configured to manage the array of SSDs 300 as multiple logical volumes. Each of the logical volumes is associated with at least one stream ID. The application component 204 is coupled to the IO controller 208 and can be configured to receive the IO request to access the logical block addressing (LBA) of a logical volume from the multiple logical volumes. The memory 210 of the host device 200 can be configured to store the association of a logical volume group, and the set stream ID can be maintained in the form of a mapping table to uniquely identify the logical volume(s) of the array of SSDs 300. Further, the host controller 206 is configured to determine the stream ID corresponding to a logical volume. Further, the host controller 206 is configured to detect the status of a stream ID corresponding to a logical volume from the NVRAM. The status is one of the active and the passive state. Further, the IO controller 208 is configured to allow access to the logical block addressing (LBA) of at least one SSD from the SSDs corresponding to the stream ID of the logical volume when the status of the stream ID is detected to be in the active state. When the host controller 206 detects that the stream ID is in the passive state, then the garbage collector 212 may perform the garbage collection function on at least one of the SSDs from the SSDs corresponding to the stream ID of the logical volume.

The communicator 214 is configured to establish the communication between the host device 200 and the array of SSDs 300 through the interface to serve the IO requests.

FIG. 2 shows example components of the host device 200 but it is to be understood that other embodiments are not limited thereto. In other embodiments, the host device 200 may include less or more components. Further, the labels or names of the components are used only for illustrative purpose and this does not limit the scope of any invention described herein. One or more component can be combined together to perform same or substantially similar function in the host device 200.

Moreover, components such as the host controller 206, garbage collector 212, and/or communicator 214 may be or include, for example, software modules (sets of executable instructions) stored in the memory 210 and executed by the processor 202. Alternatively, any or all of these or similar components may be or include, for example, software modules stored in a memory different than memory 210 and executed by a processor different than processor 202. It will be understood that labels for components such as these will be implemented with tangible components, and these and similar labels may be sometimes used herein in order to delineate processes and processing of a particular type that is performed using software that is executed by tangible processors.

Figure 3:
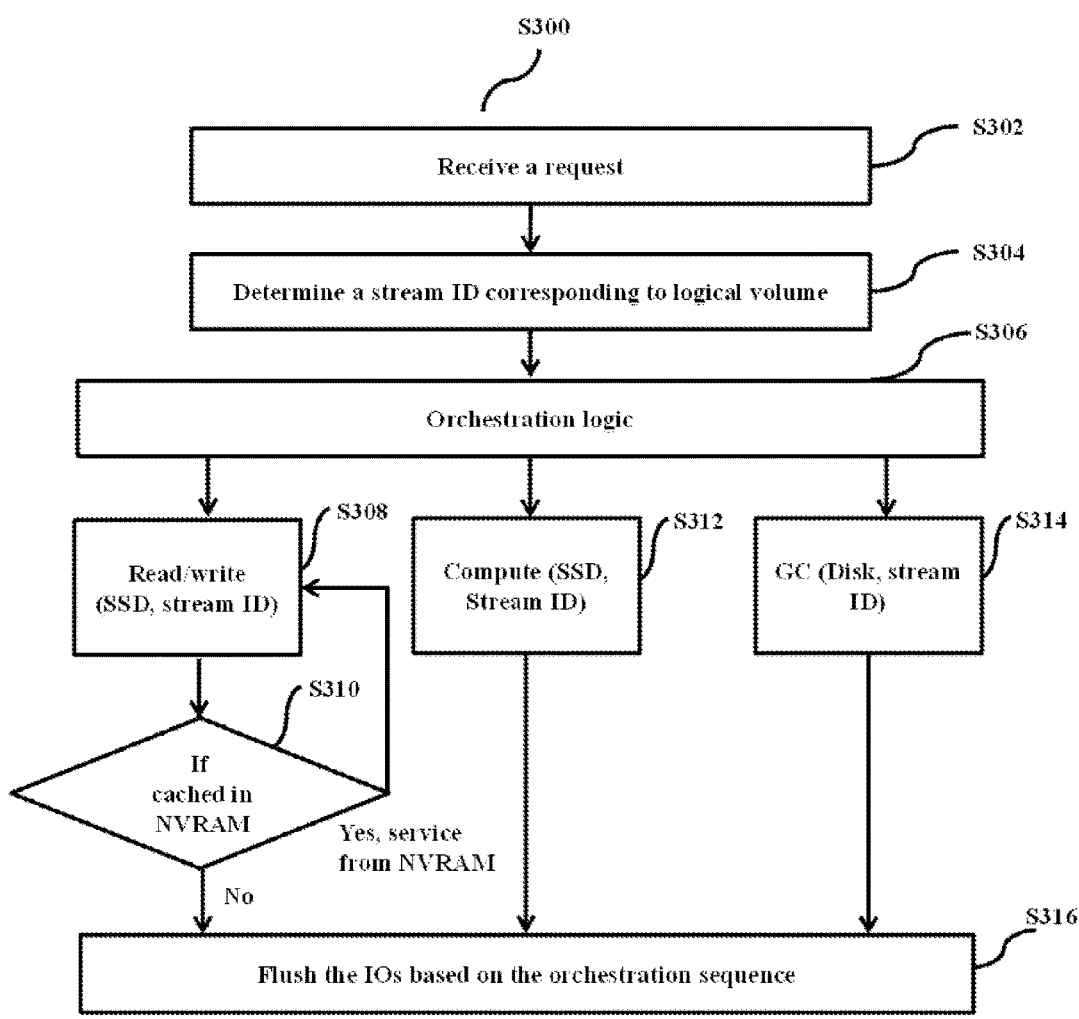
FIG. 3 is a flow diagram illustrating various operations performed by a host device for managing IO operations based on a stream identifier (ID), according to an embodiment as disclosed herein.

FIG. 3 is a flow diagram S300 illustrating operations performed by the host device 200 for managing IO operations based on the stream ID, according to an embodiment as disclosed herein.

At step S302, the host controller 206 may receive a request (i.e., read/write request from an application) to access the logical block addressing (LBA) of the logical volume from the multiple logical volumes of the SSDs.

At step S304, the host controller 206 may determine the stream ID corresponding to the logical volume of the SSDs.

At step S306, the host controller 206 may trigger the orchestration logic to determine the request type (read/write request, compute request or a GC request).

At step S308, the host controller coupled to the orchestration logic may determine the request type is a read/write request based on the stream ID active state.

At step S310, the host controller 206 may detect that the stream ID is cached in the NVRAM.

If the host controller 206 determines that the stream ID is cached in the NVRAM, then the host controller 206 may allow the request (read/write) to continue the IO operation to the logical volume of the SSDs from the NVRAM. If the host controller 206 determines that the stream ID is not cached in the NVRAM, then at step S316 the host controller 206 may flush the Input output operations (IOs) based on the orchestration sequence.

At step S312, the host controller 206 may determine the request type is a compute request (SSD, stream ID) based on the orchestration logic, and then the host controller 206 may compute the LBA for the SSD and the stream ID. Further, based on the orchestration logic the host controller 206 identifies whether the stream ID is in the active state/passive state. If the host controller 206 determines that the stream ID is in the active state then the host controller 206 flushes the IOs based on the orchestration logic. If the host controller 206 determines that the stream ID is in the passive state then the host controller 206 performs the GC.

At step S314, the host controller 206 may determine that the stream ID is in the passive state based on the orchestration logic, and then the host controller 206 performs the GC.

In an embodiment, the orchestration logic is explained with an example as below:

Input:

i0: Read/Write Volume Set={V0_io, V1_io . . . } i1: Compute Set={V0_c, V1_c . . . } One or both sets can be a null set

Output:

o0: Read/Write Set={(OD0_io, OS0_io), (OD1_io, OS1_io) . . . } o1: Compute Set={(OD0_c, OS0_c), (OD1_c, OS1_c) . . . } o2: Garbage collection Set={(OD0_g, OS0_g), (OD1_g, OS1_g) . . . } o3: Power down set={(OD0_p, OS0_p), (OD1_p, OS1_p) . . . }

The flow detail of the orchestration logic for the above-mentioned example is detailed in the following steps:

1. For each volume in i0 (input for the read/write): find disk (D_io, S_io) from volume-stream ID map.

2. Add (D_io, S_io) to o0 set (output for the read/write): o0=o0 U {(D_io, S_io) . . . }

3. For each volume in i1 (input for the compute): find disk (D_c, S_c) from volume-stream ID map.

4. Add (D_c, S_c) to o1 set (output for the compute set): o1=o1 U {(D_c, S_c) . . . }

5. Find common (Disk, stream ID) between o0 (output for the read/write) and o1 (output for the compute) and remove these from both o0 and o1 sets.

6. Distribute common elements between o0 (output for the read/write) and o1 (output for the compute). This step ensures that for a given volume, some will have the IO requests and some will have the computation requests for the LBA at the same time. Distribution of the IO request and computation request can make use of an active count, or an IOPS count.

7. From volume-stream ID map, find a disk which has a low free page count and which is not present in o0 (output for the read/write). Add all streams belonging to this disk to o2 (garbage collection set). If a disk has a low free page count and is also present in o0 (output for the read/write), remove all streams from this disk from o0 (output for the read/write) and add it back to o0 (output for the read/write) after garbage collection is over.

8. From volume-stream ID map, find stream ID whose active stream ID count is zero and add all streams belonging to this to o3 (power down set).

The various actions, acts, blocks, steps, or the like in the method of the flow diagram S300 may be performed in the order presented, in a different order or simultaneously. Further, in some embodiments, some of the actions, acts, blocks, steps, or the like may be omitted, added, modified, skipped, or the like without departing from the scope of any invention described herein.

Figure 4:
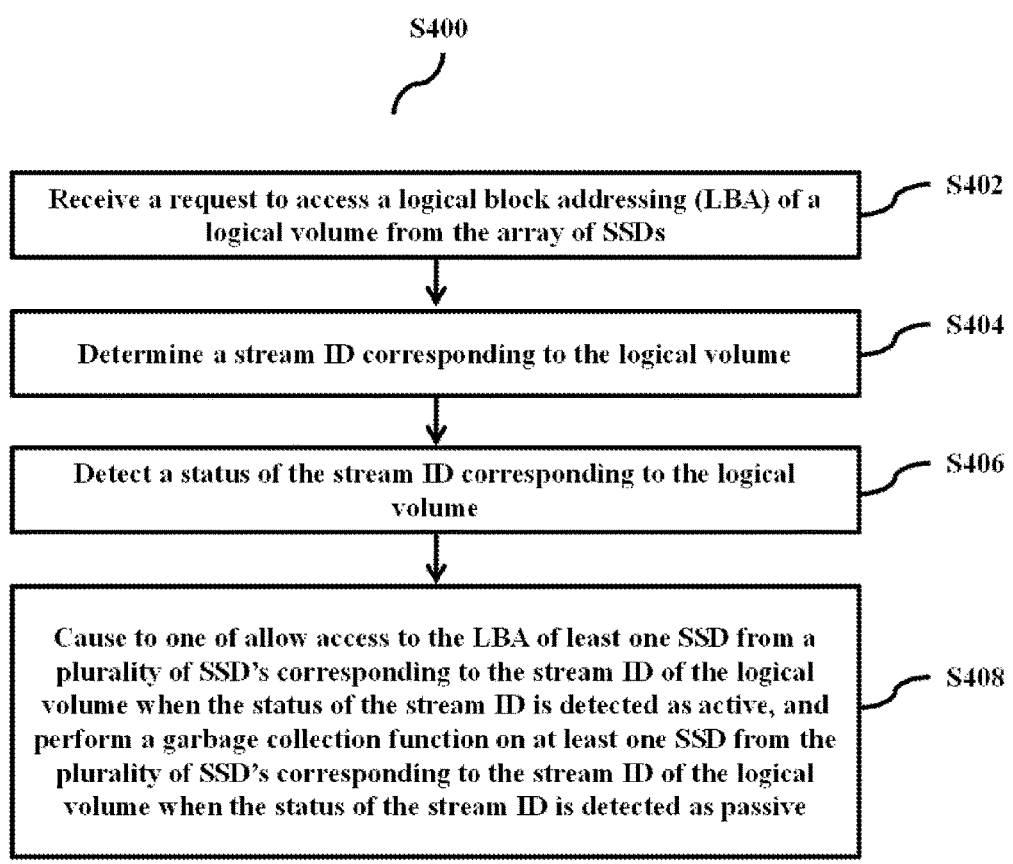
FIG. 4 is a flow diagram illustrating various operations performed by a host device for managing IO and GC operations based on a stream identifier (ID), according to an embodiment as disclosed herein.

FIG. 4 is a flow diagram S400 illustrating operations performed by the host device 200 for managing IO and GC operations based on the stream ID, according to an embodiment as disclosed herein.

At step S402, the method includes receiving the request to access the logical block addressing (LBA) of the logical volume from the multiple logical volumes. In an embodiment, the method allows the host controller 206 to receive the request to access the logical block addressing (LBA) of the logical volume from the multiple logical volumes.

At step S404, the method includes determining the stream ID corresponding to the logical volume. In an embodiment, the method allows the host controller 206 to determine the stream ID corresponding to the logical volume.

At step S406, the method includes detecting the status of the stream ID corresponding to the logical volume from the NVRAM. The detected status is one of the active state and the passive state. In an embodiment, the method allows the host controller 206 to detect the status of the stream ID corresponding to the logical volume from the NVRAM. The detected status is one of the active state and the passive state.

At step S408, the method includes causing to one of (1) allow access to the LBA of at least one SSD from the multiple SSDs corresponding to the stream ID of the logical volume when the status of the stream ID is detected as in the active state, and (2) perform the garbage collection function on at least one SSD from the SSDs corresponding to the stream ID of the logical volume when the status of the stream ID is detected as the passive state. In an embodiment, the method allows the host controller 206 to cause to one of (1) allow access to the logical block addressing (LBA) of least one SSD from the SSDs corresponding to the stream ID of the logical volume when the status of the stream ID is detected as active, and (2) perform the garbage collection function on the at least one SSD from the SSDs corresponding to the stream ID of the logical volume when the status of the stream ID is detected as the passive.

The various actions, acts, blocks, steps, or the like in the method in the flow diagram S400 may be performed in the order presented, in a different order or simultaneously. Further, in some embodiments, some of the actions, acts, blocks, steps, or the like may be omitted, added, modified, skipped, or the like without departing from the scope of any invention described herein.

Figure 5:
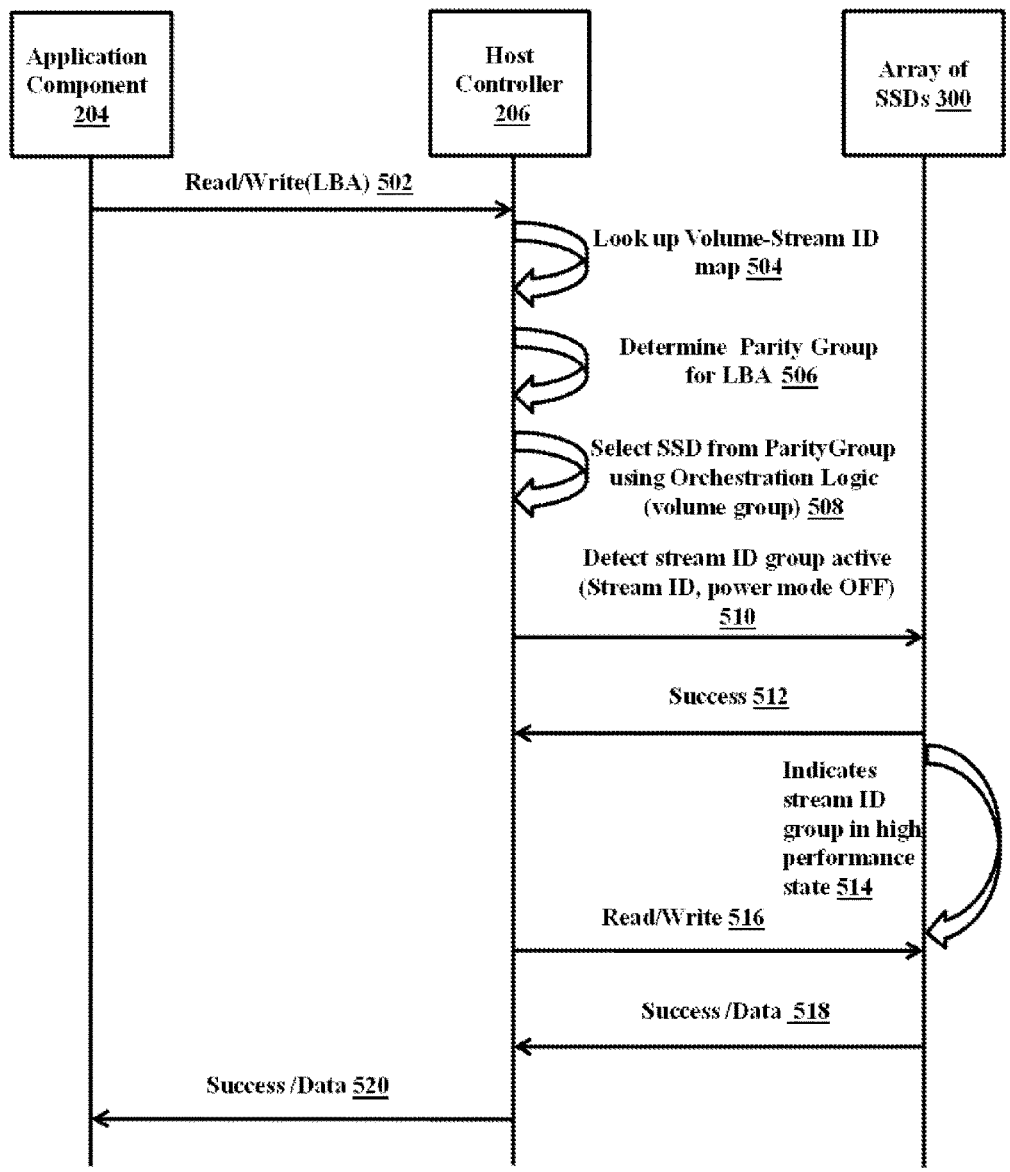
FIG. 5 is a sequence diagram illustrating a sequence for managing an IO operation for a volume associated with an array of SSDs, according to an embodiment as disclosed herein.

FIG. 5 is a sequence diagram illustrating a sequence for managing the IO operation for the volume associated with an array of SSDs 300, according to an embodiment as disclosed herein.

The application component 204 initiates an IO request (i.e., read/write) to access the logical block addressing (LBA) of the logical volume from the logical volumes. Further, the host controller 206 receives (502) the IO request from the application component 204 to access the logical block addressing (LBA) of the logical volume from the logical volumes. Further, the host controller 206 is configured to lookup (504) in the stream ID map (from the Table 1, stored in the memory 210) for the logical volume of the logical volume group associated with the array of SSDs 300. The mapping table is the association of the stream ID and the logical volumes of the logical volume group of the array of SSDs 300. Further, the NVRAM of the host controller 206 buffers the request before sending the request to the logical volume corresponding to the stream ID. The host controller 206 may determine (506) the parity group for the LBA of the logical volume from the multiple logical volumes associated with the array of SSDs 300. The host controller 206 further selects (508) the SSD for the corresponding LBA from the determined parity group (i.e., volume group associated with the array of SSDs 300) based on the orchestration logic. The flash array of SSDs maintains the following information about each of the stream ID group: increment active count for stream ID group, ideal state stream ID group and input output per second (IOPS) on stream ID group for quality of service (QoS).

The host controller 206 may detect (510) the active status (i.e., stream ID, power mode OFF) of the stream ID or the stream ID group corresponding to the LBA of the logical volume from the NVRAM. The power mode OFF indicates the power usage mode during the stream ID active. The array of SSDs 300 provides a successful acknowledgment (512) to the host controller 206 based on the determined active status of the LBA of the logical volume associated with the array of SSDs 300. The active status of the stream ID associated with the logical volume indicates (514) a high-performance state. Further, the host controller 206 allows the application request (i.e., Read/Write) (516) to access the logical block addressing (LBA) of the SSD from the SSDs corresponding to the stream ID of the logical volume and further decrements the active count for the stream ID group. Further, the array of SSDs successfully acknowledges (518) the request to the host controller and the host controller successfully acknowledges (520) the request to the application component 204.

Figure 6:
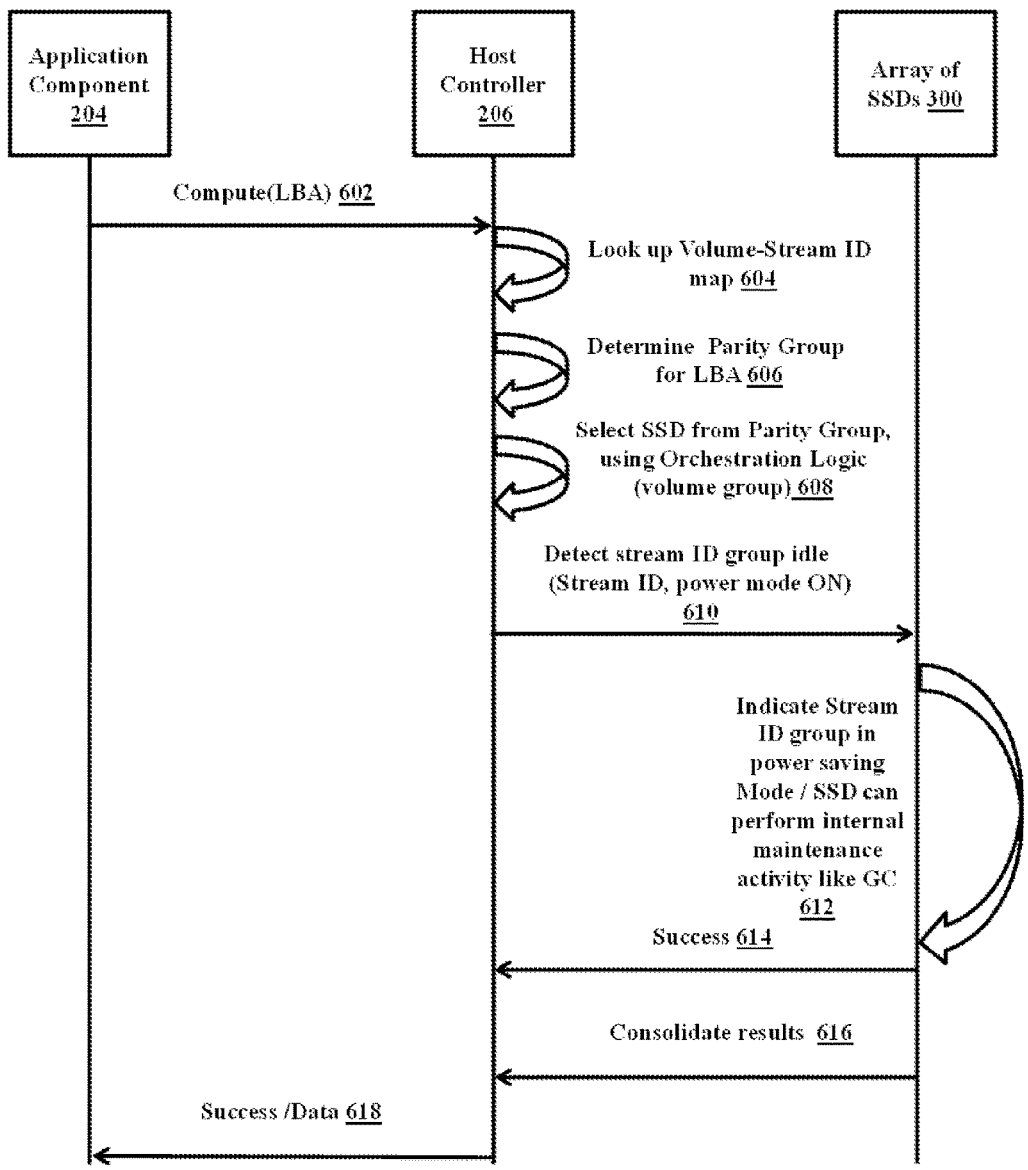
FIG. 6 is a sequence diagram illustrating a sequence in which power management of each SSD is performed based on stream ID group, according to an embodiment as disclosed herein.

FIG. 6 is a sequence diagram illustrating a sequence in which the power management of each SSD is performed based on the stream ID group, according to an embodiment as disclosed herein.

The application component 204 initiates a compute LBA request to access the logical block addressing (LBA) of the logical volume from the multiple logical volumes. Further, the host controller 206 receives (602) the compute request from the application component 204 and computes the LBA of the volume associated with the array of SSDs 300. Further, the host controller 206 is configured to lookup (604) for a stream ID map for the logical volume associated with the array of SSDs 300. The host controller 206 determines (606) the parity group for the LBA of the logical volume from the multiple logical volumes associated with the array of SSDs 300. The host controller 206 selects (608) the SSD for the LBA from the determined parity group (i.e., volume group associated with the array of SSDs 300) based on the orchestration logic. The host controller 206 detects (610) the status (i.e., Idle (stream ID, power mode ON)) of the stream ID or the stream ID group corresponding to the LBA of the logical volume from the NVRAM. The idle status of the stream ID associated with the logical volume indicates (612) the stream ID group in power saving mode and the SSD can perform internal maintenance activity like the GC.

The array of SSDs 300 provides a successful acknowledgment (614) with consolidated (616) results of the determined idle status of the stream ID group associated with the array of SSDs 300 to the host controller 206. Further, the host controller 206 successfully (618) acknowledges the request to the application component 204.

Figure 7:
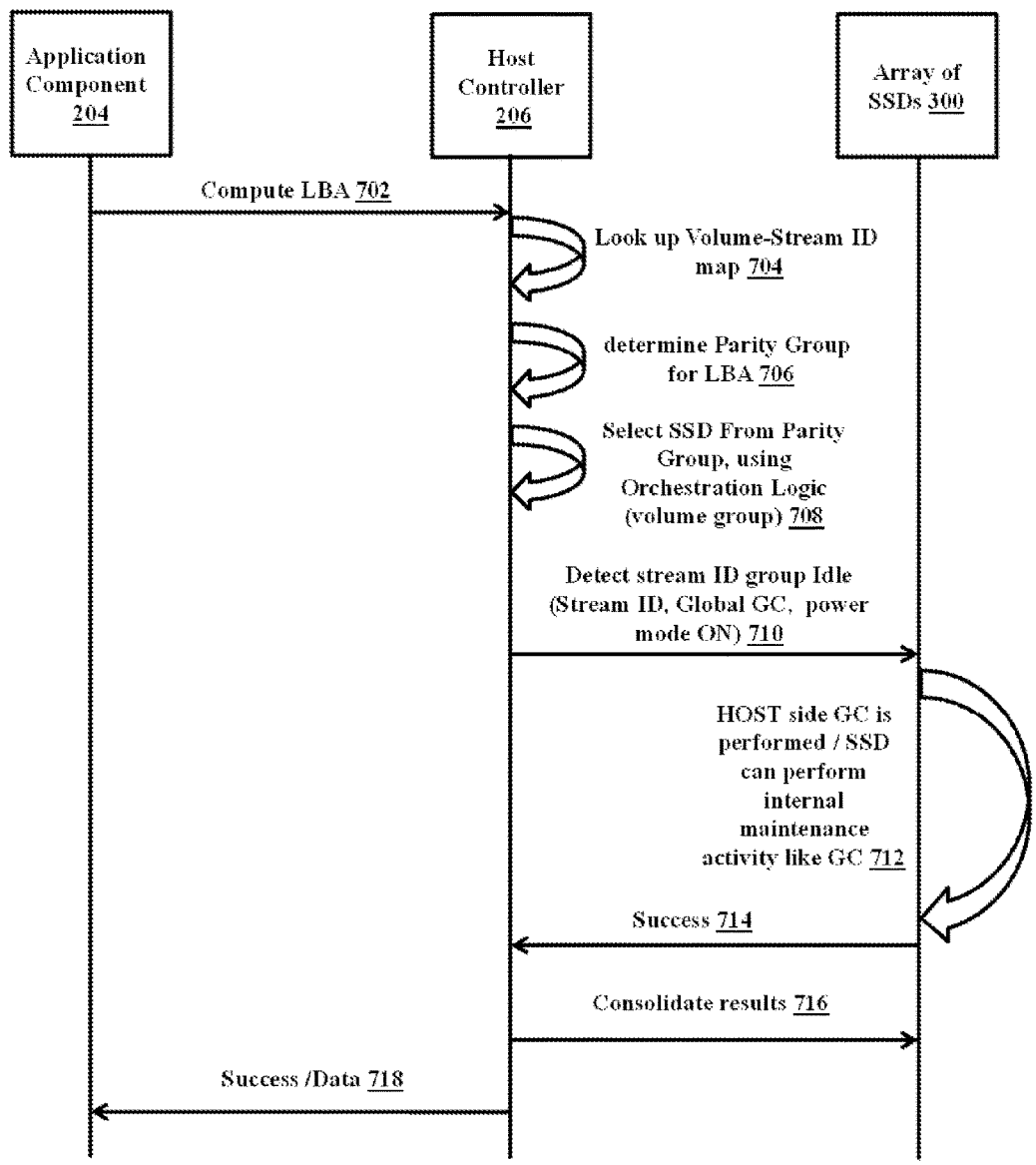
FIG. 7 is a sequence diagram illustrating a sequence for managing a global GC based on stream ID group, according to an embodiment as disclosed herein.

FIG. 7 is a sequence diagram illustrating a sequence for managing the global GC based on stream ID group, according to an embodiment as disclosed herein.

The application component 204 initiates a compute LBA request to access the logical block addressing (LBA) of the logical volume from the multiple logical volumes. Further, the host controller 206 receives (702) the compute request from the application component 204 and computes the LBA of the volume associated with the array of SSDs 300. Further, the host controller 206 is configured to lookup (704) for the stream ID map for the logical volume associated with the array of SSDs 300. The host controller 206 determines (706) the parity group for the LBA of the logical volume from the multiple logical volumes associated with the array of SSDs 300. The host controller 206 further selects (708) the SSD for the LBA from the determined parity group (i.e., volume group associated with the array of SSDs 300) based on the orchestration logic. The host controller 206 detects (710) the stream ID group Idle status (i.e., stream ID, Global GC, power mode ON)) of the stream ID or the stream ID group corresponding to the LBA of the logical volume from the NVRAM. The idle status of the stream ID associated with the logical volume indicates the stream ID group in power saving Mode. The host controller 206 can perform (712) the GC at the host device 200 and the SSD can perform internal maintenance activity like GC. The array of SSDs 300 provides a successful acknowledgment (714) with consolidated (716) results of the determined idle status of the stream ID group associated with the array of SSDs 300 to the host controller 206. Further, the host controller 206 successfully acknowledges (718) the request to the application component 204.

In an embodiment, the orchestration logic for the In-compute storage is explained with an example as below:

Input: Parity group consisting of a set of (SSD, stream ID) corresponding to a given LBA. For example, redundancy in two SSDs will be a set like {(SSD0, S0), (SSD1, S1) . . . }

Output:
1. Set of (SSD0, StreamID0) to which the IO is directed (can be one or many)
2. (SSD1, StreamID1) to which Reduce is directed The flow detail of the orchestration logic for the above-mentioned example is detailed in the following steps:
1. Find a stream ID with a minimum account in the given set. Let (Dmin, Smin) be the SSD, stream ID tuple.

2. For reduce operation, return Dmin, Smin
3. Remove Dmin, Smin from input parity group to form a new group
4. For IO operation, return new group to do IO operation
5. On completion of the reduce operation, also do IO on (Dmin, Smin).

In another embodiment, the input/output operations per second (IOPS) stream ID can be used in place of active count. Further, return the SSD with minimum reduce count. This will also work with a combination of active count, reduce count or IOPS.

Figure 8:
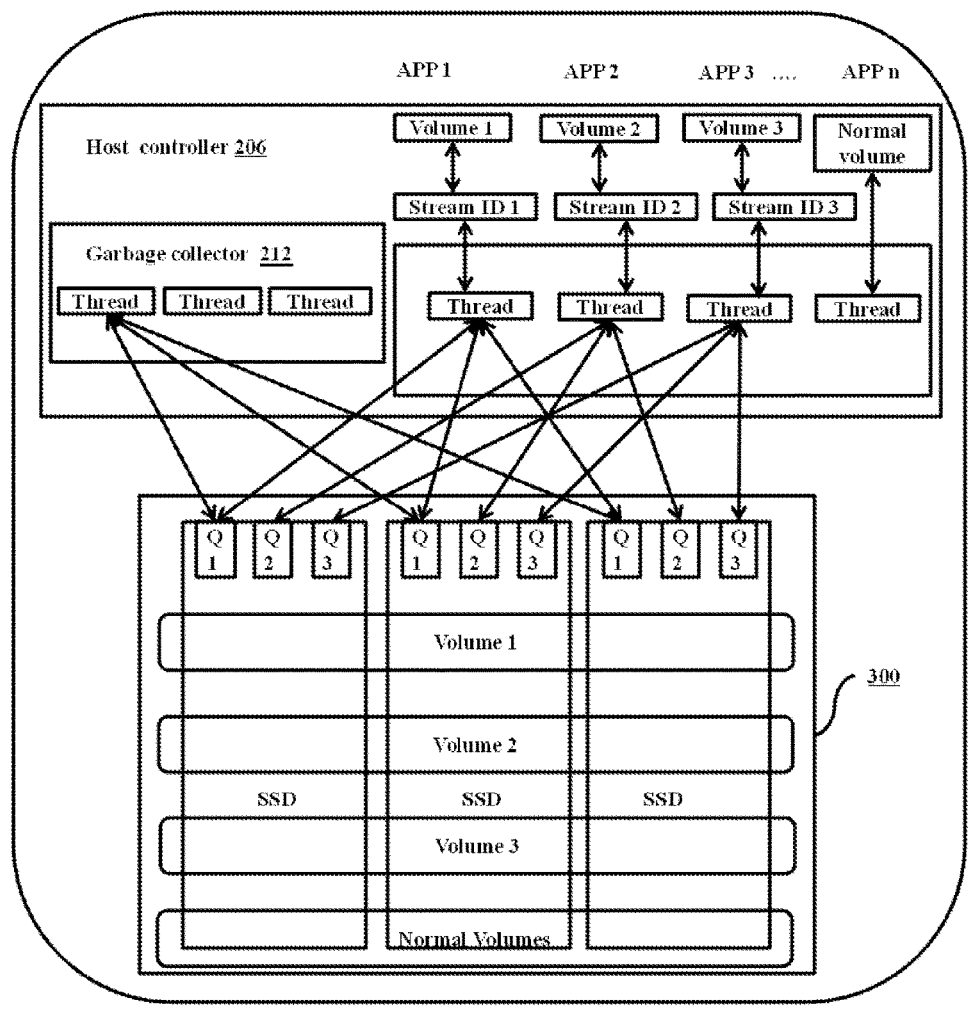
FIG. 8 illustrates an example of a storage system and mechanisms for maintaining high IOPS while performing GC in the array of SSDs, according to an embodiment as disclosed herein.

FIG. 8 illustrates an example of a storage system and mechanisms for maintaining high IOPS while performing GC in the array of SSDs 300, according to an embodiment as disclosed herein.

The host controller 206 is configured to receive multiple requests from different applications (for example: application 1, application 2, application 3 and application-n) to access the logical block addressing (LBA) of multiple logical volumes of the SSDs. The host controller 206 is further configured to determine stream IDs for the corresponding logical volumes (for example: volume 1 to stream ID 1, volume 2 to stream ID 2, volume 3 to stream ID 3 and volume n to stream ID n) associated with the array of SSDs 300. In an embodiment, each logical volume is associated with a stream ID or a set of stream IDs. The stream IDs are obtained from individual SSDs of the array of SSDs 300. For example, each stream ID can be a dedicated queue or group of stream ID can share the queue. The stream IDs can also be associated with priorities of the application requests. The host controller 206 assigns the thread to each of the stream IDs to detect a status of the stream ID associated with the different applications corresponding to the logical volumes. The NVRAM of the host controller 206 may buffer the incoming application requests before sending it to the appropriate volumes of the SSD based on the stream ID. The buffering of the stream IDs may allow the threads of the host controller 206 to determine whether the stream IDs are in active state (IO operations) or the passive state (GC). If the thread of the of the host controller 206 detects that the stream ID is in active state, then the host controller 206 allows the application component 204 to access the logical block addressing (LBA) of at least one SSD from the SSDs. Further, if the thread of the host controller 206 detects that the stream ID in passive state, then the host controller 206 allows the garbage collector 212 to perform the garbage collection function on the detected stream ID of the logical volume.

Figure 9:
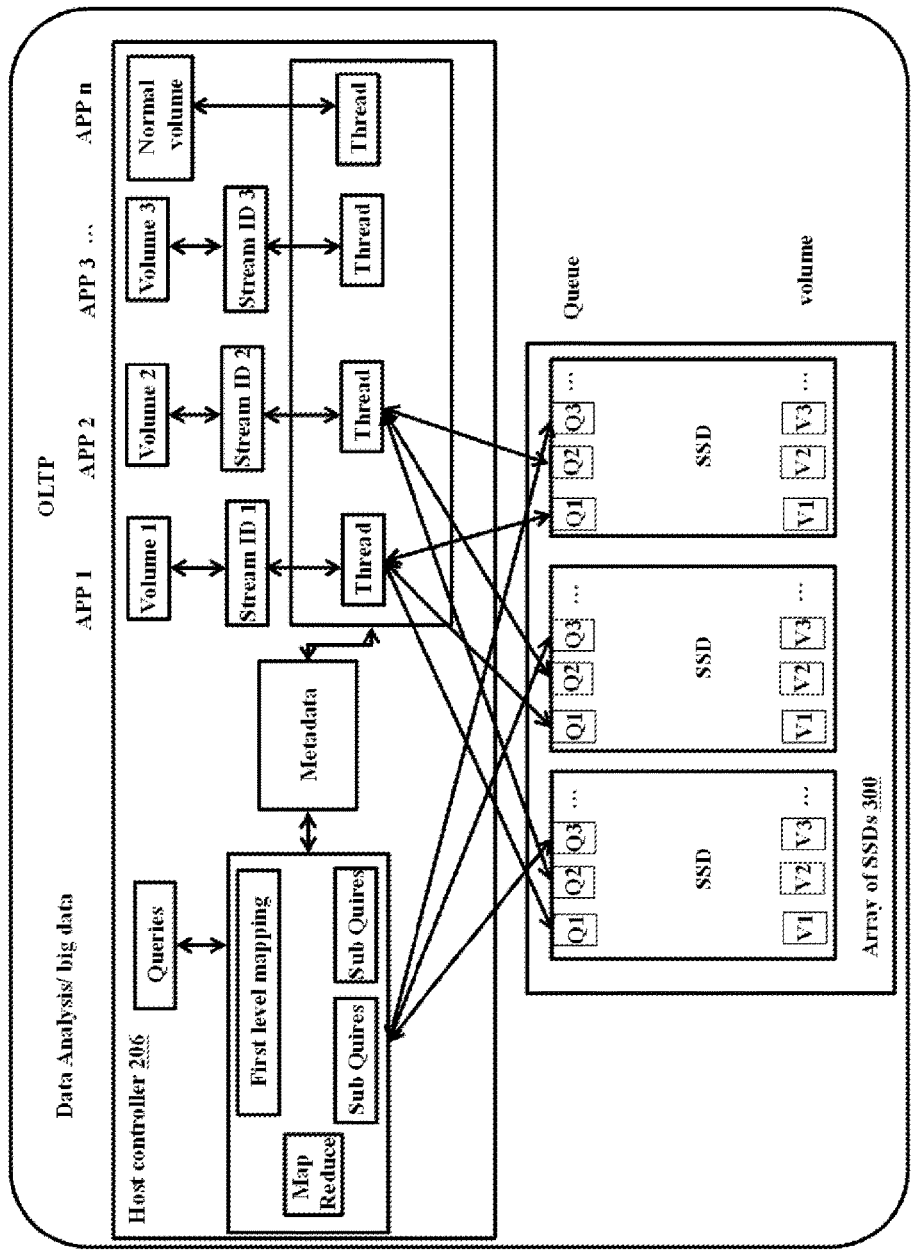
FIG. 9 illustrates an example of a storage system and mechanisms for maintaining high IOPS while doing in-storage computation based on stream ID group, according to an embodiment as disclosed herein.

FIG. 9 illustrates an example of a storage system and mechanisms for maintaining high IOPS while doing in-storage computation based on stream ID group, according to an embodiment as disclosed herein.

The Big-data/data analysis and the OLTP are serviced from two different storage servers. The big data analysis is used for business reporting and the OLTP is used for online transaction processing application such as an automated teller machine (ATM) for providing faster transaction details. The OLTP applications uses faster IOPS server and the Big-data/Data analysis will not use the faster server. This results in the usage of two different storage servers for servicing Big-data/data analysis and the OLTP. However, according to the storage system 100 the Big-data/data analysis and OLTP can be serviced from the single storage server.

The host controller 206 is configured to receive multiple requests from two different information systems; such as the Big-data/data analysis and the OLTP. For example, application 1, application 2, application 3 and application-n may send a request to the host device 200 to access a logical block addressing (LBAs) of multiple logical volumes of the array of SSD 300. The host controller 206 also receives request (i.e., queries) from the Big-data/data analysis. The host controller 206 is further configured to determine stream IDs for different OLTP applications corresponding to the logical volumes (for example: volume 1 to stream ID 1, volume 2 to stream ID 2, volume 3 to stream ID 3 and Normal volume to stream ID n) associated with the array of SSDs 300. The host controller 206 assigns the thread to each of the stream IDs to detect a status of the stream ID associated with the different OLTP applications corresponding to the logical volumes.

The NVRAM of the host controller 206 may buffer the incoming application requests before sending it to appropriate stream IDs. The buffering of the stream IDs lets the threads of the host controller 206 determine whether the stream IDs are in active state or passive state. If the thread of the host controller 206 detects that the stream ID is in the active state, then the thread of the host controller 206 allows the application to access the logical block addressing (LBA) of at least one SSD from the SSDs corresponding to the stream ID of the logical volume. Further, if the thread of the host controller 206 detects that the stream ID is in the passive state, then the host controller 206 allows the garbage collector to perform the garbage collection function on the detected stream ID of the logical volume.

The OLTP application requires faster IOPS, hence the OLTP applications requests are placed into higher priority queues and the big data analysis query requests can be place in to the lower priority queues. As, the array of SSDs 300 knows the multiple SSDs and it can orchestrate the SSDs where the IO operations are ongoing and orchestrate of the SSDs, where the data analysis is happening. During this time, the application data is not completely protected since only one copy is written to the logical volume of the SSD and this is solved by lazy pushing of those SSDs writes to some other time. In case of any power loss during this time, the data can be recovered from the NVRAM.

The storage system can be applied in the in-compute storage and big-data. A set of stream IDs can be associated with high priority queues dedicated for the OLTP based application which requires high IOPs. The stream IDs associated for lower priority queues will be dedicated for servicing data analysis operation. The data analysis query will be split according to the striping logic with the help of the module called special module (reduce module OR Map Reduce). These sub queries will be sent to respective stream IDS for each SSDs.

The array of SSDs 300 stores the data in redundant manner; and the same data is available on a group of logical volumes associated with the stream ID(s) of the SSDs forming the parity group. The array of SSDs 300 completely knows where the blocks and redundant copies are or how they can be obtained for a given LBA. To support high performance block storage and data analysis, the follow approach is used:

```
P(lba) = { parity group of LBA (lba): set of SSD and locations where lba is stored }
Request ( IO && data-analysis on lba)
{
For (p in P (lba)): do IO operation on p: stream ID (p, lba)
For ( ~p in P(lba)): do data-analysis on ~p: stream ID(~p, lba)
Enqueue (~p, lba) to a lazy-parity queue
}
```

-continued

```
During Write-flushing complete stripes to SSD:
(~p, lba) = Dequeue lazy-parity queue
SSD write to ~p complete parity for lba
```

The parity group is a given by: redundant set of SSD: physical locations from which the host controller can either read or derive given lba from volume.

Figure 10:
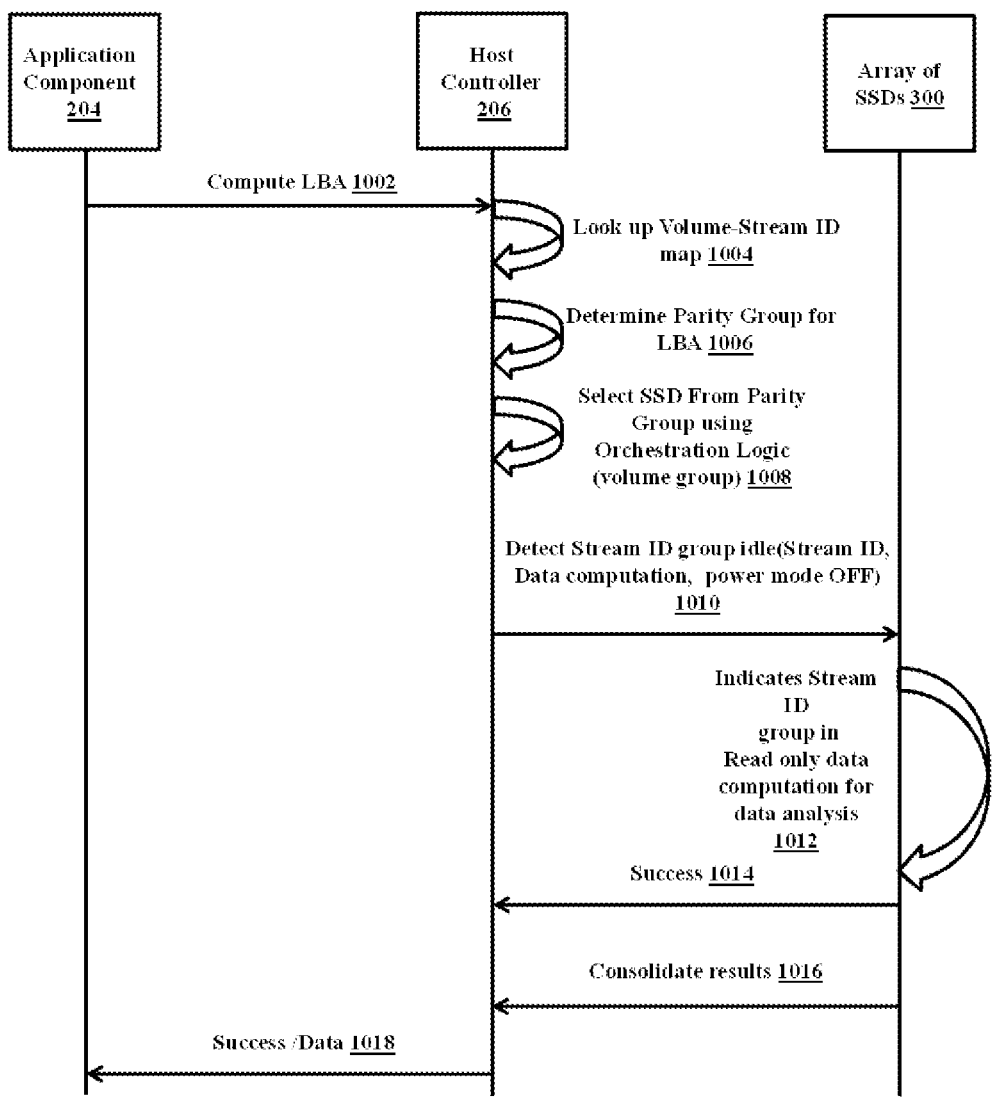
FIG. 10 is a sequence diagram illustrating a sequence for in-computing a volume of each SSD/stream ID group, according to an embodiment as disclosed herein.

FIG. 10 is a sequence diagram illustrating a sequence for in-computing a volume of each SSD/stream ID group, according to an embodiment as disclosed herein.

The application component 204 initiates a compute LBA request to access the logical block addressing (LBA) of the logical volume from the logical volumes. Further, the host controller 206 receives (1002) the compute request from the application component 204 and computes the LBA of the volume associated with the array of SSDs 300. Further, the host controller 206 is configured to lookup (1004) for a stream ID map for the logical volume associated with the array of SSDs 300. The host controller 206 determines (1006) a parity group for the LBA of the logical volume from the logical volume associated with the array of SSDs 300. The host controller 206 further selects (1008) the SSD for the LBA from the determined parity group (i.e., volume group associated with the array of SSDs 300) based on the orchestration logic. The host controller 206 detects (1010) the stream ID group Idle status (i.e., stream ID, Data computation, power mode OFF)) of the stream ID or the stream ID group corresponding to the LBA of the logical volume from the NVRAM. The stream ID group status of the logical volume indicates (1012) read only data computation for data analysis. The array of SSDs 300 provides a successful (1014) acknowledgment with consolidated (1016) results of the determined idle status of the stream ID group associated with the array of SSDs 300 to the host controller 206. Further, the host controller 206 successfully (1018) acknowledges the request to the application component 204.

Figure 11:
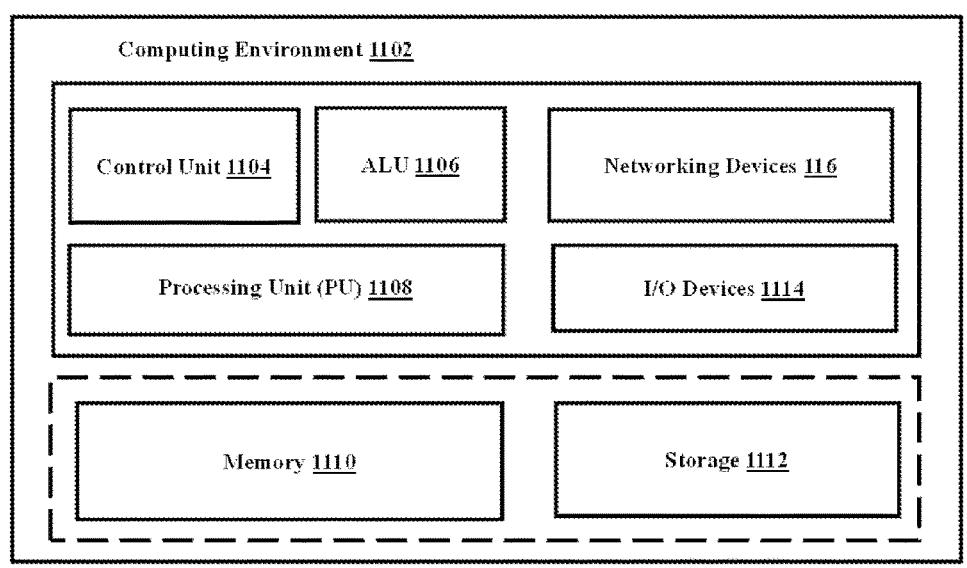
FIG. 11 illustrates a computing environment implementing the stream ID based storage system for managing an array of SSDs, according to an embodiment as disclosed herein.

FIG. 11 illustrates a computing environment implementing the stream ID based storage system for managing an array of SSDs 300, according to an embodiment as disclosed herein. As depicted the computing environment 1102 comprises at least one processing unit 1108 that is equipped with a control unit 1104 and an arithmetic logic unit (ALU) 1106, a memory 1110, a storage unit 1112, multiple networking devices 1116 and multiple input output (IO) devices 1114. The at least one processing unit 1108 is responsible for processing the instructions of the algorithm. The at least one processing unit 1108 receives commands from the control unit 1104 in order to perform its processing. Further, any logical and arithmetic operations involved in the execution of the instructions are computed with the help of the arithmetic logic unit (ALU) 1106.

The embodiments disclosed herein can be implemented through at least one software program running on at least one hardware device and performing network management functions to control the elements. The elements shown in FIGS. 1 through 11 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A storage system, comprising:
   an array of solid-state drives (SSDs) that are each operable to store data; and
   a host controller configured to manage the array of SSDs as a plurality of logical volumes, wherein each of the logical volumes is associated with at least one stream identifier (ID) and corresponds to dedicated portions of each of a plurality of the SSDs, and wherein at least one of the array of SSDs and the host controller stores a system code configured to execute stream ID commands to access each of the logical volumes.

2. The storage system of claim 1, wherein a different memory region of each of the SSDs is dedicated to each logical volume, wherein each logical volume does not overlap with another logical volume, and wherein all of the logical volumes are combined to form a logical volume group using the at least one stream ID.

3. The storage system of claim 2, wherein the host controller uses the stream ID commands to communicate with a logical volume of the logical volume group which is uniquely identified using the at least one stream ID.

4. The storage system of claim 1, wherein the stream ID command is one of a stream ID active command, a stream ID idle command, and a get stream ID status command.

5. The storage system of claim 4, wherein the stream ID idle command is associated with an operation type defining at least one of a power mode operation, a garbage collector operation, a data computation operation, and a custom operation.

6. The storage system of claim 1, wherein at least one of the SSDs and the host controller implements the system code and is configured to coexist with redundant array of independent disk (RAID) drivers loaded by an operating system.

7. The storage system of claim 1, wherein the host controller is further configured to:
   receive a request to access a logical block addressing (LBA) of a logical volume from the plurality of logical volumes;
   determine a stream ID corresponding to the logical volume;
   detect a status of the stream ID corresponding to the logical volume from a non-volatile random-access memory (NVRAM), wherein the status is one of active and passive; and
   cause to one of allow access to the LBA of at least one SSD from the plurality of SSDs corresponding to the stream ID of the logical volume when the status of the stream ID is detected as active, and perform a garbage collection function on at least one SSD from the plurality of SSDs corresponding to the stream ID of the logical volume when the status of the stream ID is detected as passive.

8. The storage system of claim 7, wherein the at least one SSD for the LBA is selected from a parity group based on an orchestration logic, wherein the parity group is determined based on the LBA.

9. The storage system of claim 7, wherein the garbage collection function on the at least one SSD from the plurality of SSDs is performed based on an orchestration sequence.

10. The storage system of claim 7, wherein the request is one of a read request, a write request, and a LBA compute request.

11. The storage system of claim 7, wherein the NVRAM is configured to buffer the request to access the LBA before sending the request to the logical volume corresponding to the stream ID.

12. The storage system of claim 11, wherein the host controller is configured to set the status of each of the stream IDs in the NVRAM based on the stream ID commands.

13. A host device, comprising:
   a processor; and
   a host controller, connected to the processor and an array of solid-state drives (SSDs), wherein the host controller is configured to:
   manage the array of SSDs as a plurality of logical volumes, wherein each of the logical volumes is associated with at least one stream identifier (ID) and corresponds to dedicated portions of each of a plurality of the SSDs, and wherein the host controller stores a system code configured to execute stream ID commands to access each of the logical volumes.

14. The host device of 13, wherein the host controller is configured to:
   receive a request to access a logical block addressing (LBA) of a logical volume from the plurality of logical volumes;
   determine a stream ID corresponding to the logical volume;
   detect a status of the stream ID corresponding to the logical volume from a non-volatile random-access memory (NVRAM), wherein the status is one of active and passive; and
   cause to one of allow access to the LBA of at least one SSD from the plurality of SSDs corresponding to the stream ID of the logical volume when the status of the stream ID is detected as active, and perform a garbage collection function on at least one SSD from the plurality of SSDs corresponding to the stream ID of the logical volume when the status of the stream ID is detected as passive.

15. The host device of claim 14, wherein the at least one SSD for the LBA is selected from a parity group based on an orchestration logic, wherein the parity group is determined based on the LBA.

16. The host device of claim 14, wherein the garbage collection function on the at least one SSD from the plurality of SSDs is performed based on an orchestration sequence.

17. The host device of claim 14, wherein the request is one of a read request, a write request, and a LBA compute request.

18. The host device of claim 14, wherein the NVRAM is configured to buffer the request to access the LBA before sending to the logical volume corresponding to the stream ID.

19. A method for managing an array of SSDs, comprising:
   receiving, by a host controller, a request to access a logical block addressing (LBA) of a logical volume from the array of SSDs, wherein the SSDs are dedicated to a plurality of logical volumes that each correspond to dedicated portions of each of a plurality of the SSDs;
   determining by the host controller, a stream ID corresponding to the logical volume;

detecting by the host controller, a status of the stream ID corresponding to the logical volume, wherein the status is one of active and passive; and causing, by the host controller, to one of allow access to the LBA of at least one SSD from a plurality of SSDs corresponding to the stream ID of the logical volume when the status of the stream ID is detected as active, and perform a garbage collection function on at least one SSD from the plurality of SSDs corresponding to the stream ID of the logical volume when the status of the stream ID is detected as passive.

20. The method of claim 19, wherein the host controller detects the status of the stream ID corresponding to the logical volume from a non-volatile random-access memory (NVRAM), wherein the NVRAM is configured to buffer the request to access the LBA before sending to the logical volume corresponding to the stream ID.

* * * * *